United States Patent [11] 3,628,990

[72] Inventors Hatohiko Kamada;
Kouich Tashiro, both of Kanagawa, Japan
[21] Appl. No. 753,896
[22] Filed Aug. 20, 1968
[45] Patented Dec. 21, 1971
[73] Assignee Fuji Shashin Film Kabushiki Kaisha
Kanagawa, Japan
[32] Priority Aug. 22, 1967
[33] Japan
[31] 42/53876

[54] ELECTROLESS PLATING PRETREATMENT METHOD
10 Claims, No Drawings

[52] U.S. Cl. .......... 117/71 R, 117/6, 117/8, 117/11, 117/47 A, 117/62, 117/69, 117/81, 117/83, 117/160
[51] Int. Cl. .......... B44d 1/14
[50] Field of Search .......... 117/47 R, 47, 71, 72, 80, 83, 160, 62, 6, 8, 11, 87, 69

[56] References Cited
UNITED STATES PATENTS

| | | | |
|---|---|---|---|
| 3,035,915 | 5/1962 | Cohen et al. | 117/47 R X |
| 3,035,916 | 5/1962 | Heiart | 117/47 R X |
| 3,142,581 | 7/1964 | Leland | 117/47 R |

*Primary Examiner*—Alfred L. Leavitt
*Assistant Examiner*—C. K. Weiffenbach
*Attorney*—Sughrue, Rothwell, Mion, Zinn & Macpeak

ABSTRACT: An electroless plating pretreatment method which comprises coating an insulating basic substrate with a first layer which comprises a soluble polyester, coating the polyester layer with a gelatin, and then treating the coated substrate with a mixed solution of bichromate and sulfuric acid or chromic anhydride and sulfuric acid. Any standard electroless process may then be used, including standard activation and sensitization steps.

ELECTROLESS PLATING PRETREATMENT METHOD

BACKGROUND OF THE INVENTION

1. Field of the Invention

This invention relates to a method of pretreatment in electrolessly plating an insulating material, such as a plastic or a porcelain.

2. Description of the Prior Art

The plastics art has lately developed "engineering plastics," which can serve many of the functions of metals. Studies have been conducted to produce a new material having the features of both a plastic and a metal by plating a plastic with a metal.

Metal plating of a plastic improves its weatherproofing properties, imparts electric conductivity thereto, improves its mechanical properties, such as surface hardness, abrasion resistance, tensile strength and shock resistance, increases its heat resistance, decreases its water-absorption capacity and imparts a metallic feeling thereto.

Metal-plated plastics are available for use as printed wiring sheets in electronic computers, communication devices, tape recorders, televisions and radios. The advantages described in the prior paragraph are also found in plated insulating substances, such as porcelain, which have been plated with metals.

Previous attempts to apply a metallic foil to an insulating basic substance have generally been carried out by adhering the metallic foil to the substrate with a suitable adhesive, or else by coarsening the basic substrate mechanically or chemically, then subjecting the substrate to electroless plating and finally to electroplating the substrate to obtain the desired metallic foil thickness. The present invention is concerned with a modification of the latter method.

The most important feature of the latter method lies in the method of imparting a sufficient electrical conductivity to the insulating basic substrate, since a thick electroplating can readily be obtained if the substrate has sufficient electrical conductivity. For example, one "conductivity-imparting" method involves adsorbing a suitable catalytic material on the surface of a plastic and immersing the treated plastic in an electroless plating solution to effect electroless plating, the adsorbing of the catalytic material generally comprising the steps of "sensitizing" and "activating."

Ordinarily, before adsorbing a catalytic material on the insulating basic substance or plastic, a coarsening treatment (mechanical or chemical) is carried out to increase the adsorbing and to strengthen the adhesion between the plastic and the electroless plate. As a chemical-coarsening pretreatment, for example, a chemical-coarsening solution consisting of 96.2 percent by weight of perchloroethylene, 3.0 percent by weight of dioxane, 0.3 percent by weight of p-toluenesulfonic acid and 0.5 percent by weight of finely divided diatomaceous earth may be used. As a mechanical coarsening pretreatment, for example, a tumbling method, wherein the plastic and powdered pumice (100–150 mesh) are charged to a barrel and rotated by 1–5L at 40–50 r.p.m., it typical.

SUMMARY OF THE INVENTION

It has been found that greatly improved results can be obtained in electroless plating operations if the novel pretreatment process of the present invention is utilized.

The pretreatment, which is primarily directed towards basic insulating substance, such as plastics and porcelains, comprises coating the substrate with a first layer which comprises a soluble polyester mixed, if necessary, with a cellulose ester, drying, and then applying a second layer which comprises an organic solvent dispersion of gelatin and drying. The coated substrate is then contacted with a mixed solution of chromic anhydride and sulfuric acid or bichromate and sulfuric acid and finally washed to remove the gelation layer, preferably with water.

The substrate may then be activated, sensitized and coated according to any conventional electroless plating technique. The electroless plate has been found to offer an excellent substrate for standard electroplating techniques.

It is the principal object of the invention to provide an improved method of pretreatment in electroless plating, which is superior to the prior art.

It is a further object of the invention to provide an electroless plating pretreatment which enables the subsequent production of an excellent electroplate.

DESCRIPTION OF THE PREFERRED EMBODIMENTS

The present invention consists in applying an organic solvent solution, of a polyester-type polymer, mixed (if necessary) with a cellulose ester, to an insulating basic substance such as plastic or porcelain, drying, then applying thereto gelatin, preferably in the form of an organic solvent dispersion of gelatin, drying, immersing or etching the thus-coated basic surface in a mixed solution of chromic anhydride and sulfuric acid or bichromate and sulfuric acid, and washing to remove the gelatin layer, preferably with water. After the etching treatment, the basic substance is subjected to sensitization and activation, followed by any conventional electroless plating.

If, during the pretreatment method of this invention, either of the two layers which are to be provided on the basic substance is omitted, metallic adhesion will not be good. The same result is found if the etching treatment is omitted, though both layers are provided. That is to say, the pretreatment of this invention is characterized by carrying out an etching treatment after such a two layer coating has been formed.

Sufficient electrical conductivity to conduct a standard electroplating will be given to an insulating substance when the insulating substance is subjected to the pretreatment of the present invention, sensitized and activated, and thereafter electroless plated in a conventional manner. Electroplating is carried out by utilizing the electric conductivity of the resulting electroless plating layer.

When employing electroless silver plating, activating may be omitted, but when employing a copper plating as the electroless layer, the activating must be carried out in order to obtain a good result. (Cf. "Kinzoku Hyomen Gijutsu" (Metal Surface Engineering) Vol. 16, No. 1, 1965, pp. 18–33).

The following examples are given in order to illustrate the invention in detail.

EXAMPLE 1

A polyethylene terephthalate film (hereinafter referred to as "PET film") having a thickness of 50 microns was used as the basic substance. A solution having the following analysis was coated thereon as the first layer, and then dried.

| First layer: | |
|---|---|
| polycondensation product ethylene glycol-isophthalic acid-triethylene glycol | 0.3 part |
| ethylene dichloride | 62.0 parts |
| acetone | 18.0 parts |
| nitrocellulose | 0.2 part |
| tetrachloroethane | 9.7 parts |
| phenol | 9.8 parts |

An organic solvent dispersion having the following analysis was coated on as the second layer and then dried.

| Second layer: | |
|---|---|
| gelatin | 1 part |
| water | 2 parts |
| methyl alcohol | 20.7 parts |
| methyl glycol | 16.0 parts |
| ethylene chloride | 50 parts |
| salicylic acid | 0.3 part |
| acetone | 10 parts |

After the foregoing solutions were coated onto the surface of the PET film and dried, etching was carried out with either of the following solutions:

| | | |
|---|---|---|
| | a) potassium bichromate | 5 parts |
| | sulfuric acid | 65 parts |
| | water | 30 parts |
| or | b) chromic anhydride | 1 part |
| | sulfuric acid | 63 parts |
| | water | 36 parts |

After etching, the PET film was washed with water. For comparison purposes, other processings were carried out comprising: first layer coating-drying-etching; second layer coating-drying-etching; and second layer coating-drying-no etching.

The sensitizing, activating and electroless metal plating were then performed with the following:

| | | |
|---|---|---|
| Sensitizing | stannous chloride | 0.6 part |
| | hydrochloric acid | 1.0 part |
| | water | 98.4 parts |
| Activating | palladium chloride | 0.03 part |
| | hydrochloric acid | 1 part |
| | water | 98.97 parts |

The processed film was then subjected to electroless copper plating and nickel plating to a thickness of 0.4 microns. The PET was then electroplated to give a thick copper plating and a nickel plating, respectively. The stripping strength and the electrical characteristics of the plated PET film were measured, the following results being obtained:

a. Stripping results: copper plating (70-microns thick) from the PET film (50-microns thick)

| | |
|---|---|
| Two layers coating, drying, etching: | 1.2–1.4 kg./cm. |
| Comparison: | |
| First layer coating only, drying, etching | 0.1 kg./cm. |
| Second layer coating only, drying, etching | 0.05–0.1 kg./cm. |
| Two layers coating, drying, no etching | 0.2–0.3 kg./cm. |

The stripping test was carried out according to the provision of JISC 6481.

Electrical characteristics of the PET film subjected to the two layer coating and etching (measured according to the JIS C 6481):

| | |
|---|---|
| insulation resistance | $3.0\times10^{13}$–$5\times10^{14}$ |
| surface resistance | $7.0\times10^{15}$–$1.0\times10^{16}$ |
| volume resistivity | $2.0\times10^{16}$–$2.2\times10^{16}$ |
| dielectric loss tangent | 0.019–0.021 |
| dielectric constant | 2.9–3.2 |

b. Stripping results of a nickel plating (10-microns thick) from the plated PET film (50-microns thick)

| | |
|---|---|
| Two layers coating, drying, etching | 1.0–1.2 kg./cm. |
| Comparison: | |
| First layer coating only, drying, etching | 0.1–0.2 kg./cm. |
| Second layer coating only, drying, etching | 0.1–0.2 kg./cm. |
| Two layers coating, drying, no etching | 0.1–0.2 kg./cm. |

EXAMPLE 2

A basic substance of porcelain having a thickness of 1.5 mm. was coated with a first and second layer having the analysis shown below, and then subjected to an etching treatment. For comparison, other processings were carried out comprising plating a first layer coating only, a second layer coating only, and a two layer coating without etching, respectively.

| | |
|---|---|
| First layer: | |
| polycondensation product of ethylene glycol-isophthalic acid-triethylene glycol | 6 parts |
| ethylene dichloride | 51 parts |
| acetone | 15 parts |
| nitrocellulose | 3 parts |
| tetrachloroethane | 8 parts |
| phenol | 7 parts |
| Second layer: | |
| same composition as that of example 1 | |
| Composition of etching solution utilized | |
| same composition as that of example 1 | |
| Sensitizing and activating | |
| same composition as in example 1 | |

The pretreated porcelain was then subjected to electroless copper plating and electroless nickel plating to give a thickness of about 0.4 microns and then to electroplating to give a copper plating of 35-microns thickness and a nickel plating of 10-microns thickness, respectively. The stripping results were as follows:

a. Stripping results of a copper plating (35-microns thick) from a basic substance of porcelain (1.5-mm. thick)

| | |
|---|---|
| Two layers coating, drying, etching | 0.9–1.2 kg./cm. |
| First layer coating only, drying, etching | 0.2–0.3 kg./cm. |
| Second layer coating, drying, etching | 0.03–0.08 kg./cm. |
| Two layers coating, drying, no etching | 0.1–0.3 kg./cm. |

Test method: same as utilized in example 1

| | |
|---|---|
| Electrical characteristics: | |
| insulation resistance | $2.5\times10^{13}$–$4.0\times10^{14}$ |
| surface resistance | $7.0\times10^{15}$–$1.0\times10^{16}$ |
| volume resistivity | $1.7\times10^{16}$–$2.0\times10^{16}$ |
| dielectric loss tangent | 0.0200–0.021 |
| dielectric constant | 3.0–3.2 |

b. Stripping results of a nickel plating (10-microns thick) from a basic substance of porcelain (1.5-mm. thick)

| | |
|---|---|
| Two layers coating, drying, etching | 1.0–1.5 kg./cm. |
| First layer coating, drying, etching | 0.4–0.45 kg./cm. |
| Second layer coating, drying, etching | 0.1–0.2 kg./cm. |
| Two layers coating, drying, no etching | 0.4–0.5 kg./cm. |

It can be seen that the pretreatment of the present invention yielded substantially better results.

It will be understood that plastic and porcelain are merely representative of the vast number of basic substances that can be pretreated according to the present invention, and reference may be made to the electroless plating prior art for an expansion of this class.

In addition, it will be understood that any standard electroless plating process may be utilized. No criticality has been placed on the exact bath used, and it is believed one skilled in the art can select any of the standard baths available.

What is claimed is:

1. An electroless plating pretreatment method which comprises:
   forming a first layer of a soluble polyester which comprises a polycondensation product of ethylene glycol, isophthalic acid and triethylene glycol on an insulating substrate;
   drying said first layer;
   forming a second layer which comprises gelatin onto said first layer;
   drying said second layer; and
   treating the thus coated insulating substrate with a member selected from the group consisting of a bichromate-sulfuric acid solution and a chromic anhydride-sulfuric acid solution.

2. The method of claim 1 wherein said gelatin is coated onto said first layer in the form of an organic solvent dispersion.

3. The method of claim 1 wherein said insulating substrate is a member selected from the group consisting of plastics and porcelains.

4. The method of claim 1 wherein said first layer further comprises a cellulose ester.

5. The method of claim 1 wherein said polyester is applied in an organic solvent mixture comprising ethylene dichloride, acetone, nitro cellulose, tetra chloroethane and phenol.

6. The method of claim 1 further comprising removing said gelatin.

7. The method of claim 11 wherein said organic solvent dispersion of gelatin comprises water, methyl glycol, ethylene chloride, salicylic acid and acetone.

8. The method of claim 1 which further comprises removing said gelatin and thereafter activating and sensitizing the remaining coated substrate.

9. The method of claim 8 further comprising, after said activating and sensitizing, plating onto said activated and sensitized coated substrate a metal selected from the group consisting of copper and nickel.

10. The method of claim 8 wherein said gelatin is removed by washing.

* * * * *